(12) United States Patent
Liang et al.

(10) Patent No.: US 10,813,130 B2
(45) Date of Patent: Oct. 20, 2020

(54) MEDIUM ACCESS CONTROL METHOD BASED ON BROADCAST PREAMBLE SAMPLING FOR COGNITIVE SENSOR NETWORK

(71) Applicant: SHENYANG INSTITUTE OF AUTOMATION, THE CHINESE ACADEMY OF SCIENCES, Liaoning (CN)

(72) Inventors: Wei Liang, Liaoning (CN); Haibin Yu, Liaoning (CN); Meng Zheng, Liaoning (CN); Manyi Du, Liaoning (CN); Shuai Liu, Liaoning (CN); Yutuo Yang, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 245 days.

(21) Appl. No.: 16/073,041

(22) PCT Filed: Sep. 7, 2017

(86) PCT No.: PCT/CN2017/100828
§ 371 (c)(1),
(2) Date: Jul. 26, 2018

(87) PCT Pub. No.: WO2018/153053
PCT Pub. Date: Aug. 30, 2018

(65) Prior Publication Data
US 2020/0245358 A1    Jul. 30, 2020

(30) Foreign Application Priority Data

Feb. 21, 2017    (CN) .......................... 2017 1 0092252

(51) Int. Cl.
| | | |
|---|---|---|
| H04W 74/08 | (2009.01) | |
| H04L 1/18 | (2006.01) | |
| H04W 84/18 | (2009.01) | |

(52) U.S. Cl.
CPC ....... *H04W 74/0816* (2013.01); *H04L 1/1812* (2013.01); *H04W 84/18* (2013.01)

(58) Field of Classification Search
CPC .. H04W 74/0816; H04W 84/18; H04L 1/1812
See application file for complete search history.

(56) References Cited

U.S. PATENT DOCUMENTS

| | | | | |
|---|---|---|---|---|
| 8,588,697 B1 * | 11/2013 | Vargantwar | ........... | H04W 76/38 455/63.1 |
| 8,830,848 B1 * | 9/2014 | Shetty | ................. | H04W 68/005 370/252 |

(Continued)

*Primary Examiner* — Khaled M Kassim
(74) *Attorney, Agent, or Firm* — Smith, Grambrell & Russell, LLP

(57) ABSTRACT

The present invention relates to cognitive wireless sensor network technologies, and in particular to a medium access control method for a cognitive sensor network based on broadcast preamble sampling. A cognitive node in the cognitive sensor network adopts a periodical dormancy-awakening mechanism. Firstly, a state of a primary user is judged by using a spectrum sensing technology. If the primary user is not active, a data sending node establishes a communication link by using a broadcast preamble code. Each neighbor node simultaneously considers information of hops from a gateway according to an awakening order, and independently determines to serve as a relay node for forwarding data. Furthermore, a transmission conflict between the cognitive node and the primary user may be caused due to return or missed alarm of the primary user. The present invention adopts a retransmission mechanism based on confirmation to ensure transmission reliability of data packets. The present invention is independent of a common control channel, and can realize reliable access of (Continued)

the cognitive sensor network for an authorized frequency band at low overhead.

5 Claims, 2 Drawing Sheets

(56) References Cited

U.S. PATENT DOCUMENTS

| | | | | |
|---|---|---|---|---|
| 10,470,082 | B2* | 11/2019 | Rengarajan | H04L 41/12 |
| 2008/0089389 | A1* | 4/2008 | Hu | H04B 1/713 |
| | | | | 375/132 |
| 2009/0305639 | A1* | 12/2009 | Zhou | H04W 52/343 |
| | | | | 455/67.11 |
| 2010/0091789 | A1* | 4/2010 | Choi | H04W 72/0446 |
| | | | | 370/445 |
| 2015/0092703 | A1* | 4/2015 | Xu | H04W 72/0446 |
| | | | | 370/329 |
| 2016/0345362 | A1* | 11/2016 | Lee | H04W 74/0816 |
| 2017/0303220 | A1* | 10/2017 | Sadeghi | H04W 56/00 |
| 2017/0332368 | A1* | 11/2017 | Einhaus | H04L 5/0026 |
| 2018/0146489 | A1* | 5/2018 | Jin | H04W 40/00 |

* cited by examiner

MEDIUM ACCESS CONTROL METHOD BASED ON BROADCAST PREAMBLE SAMPLING FOR COGNITIVE SENSOR NETWORK

TECHNICAL FIELD

The present invention relates to wireless sensor network technologies, and in particular to a medium access control method based on broadcast preamble sampling for a cognitive sensor network.

BACKGROUND

A wireless sensor network as an event monitoring and data collecting technology is widely applied to the fields of environmental monitoring, military monitoring, industrial application and the like. With the rapid increase of wireless services, because a wireless sensor network device, WIFI, Bluetooth, a radio frequency identification (RFID) and other technologies also use industrial, scientific and medical frequency bands, an authorization-free spectrum band becomes very crowded. Openness and sharing characteristics of a wireless channel causes that the wireless sensor network device may be disturbed by other technologies, thereby affecting network performance. A cognitive wireless sensor network introduces a cognitive radio technology into the wireless sensor network, so that dynamic access of a cognitive sensor (CS) for an authorized frequency band is realized, thereby providing a solving idea for the above problem. However, the key point of determining the performance of the cognitive wireless sensor network is still the design of a medium access control (MAC) method. The MAC method of a traditional wireless sensor network only considers a transmission collision problem among sensing nodes in case of communication in the authorization-free frequency band. However, the cognitive wireless sensor network mainly faces the authorized frequency band, and needs to strictly protect primary users (PU) in addition to solving the collision among CSs, thereby realizing transparent transmission of CSs for PUs.

Most of existing MAC methods of the cognitive wireless sensor network assume a preset common control channel for interaction of control information among CSs. However, if the common control channel is adopted, one channel is wasted. In addition, the common control channel also has a problem of saturation of the control channel. Once the control channel is attacked, the cognitive wireless sensor network cannot be operated normally. In addition, because the CSs adopt a dormancy-awakening mechanism in order to save energy, a large transmission time delay of data packets is caused.

SUMMARY

In view of problems of saturation of control channels, waste of resources and increase of transmission time delay due to a dormancy-awakening mechanism in an opportunity spectrum access method adopted in a traditional cognitive sensor network, the present invention proposes a medium access control method based on broadcast preamble sampling for a cognitive sensor network capable of realizing access of the cognitive sensor network for an authorized frequency band at low overhead, high reliability and low time delay.

A technical solution adopted in the present invention to solve the technical problem is as follows: A medium access control method based on broadcast preamble sampling for a cognitive sensor network is disclosed. A cognitive sensor CS executes the following steps in each dormancy-awakening cycle:

step 1, spectrum sensing: the CS detects whether primary users are occupying an authorized frequency band; if the primary users do not occupy the authorized frequency band, execute step 2; otherwise, execute step 7;

step 2, carrier sensing: the CS conducts carrier sensing; when a carrier sensing result shows that a channel is not occupied, execute step 3; when the carrier sensing result shows that the channel is busy and receives a preamble code, if a forwarding condition is not satisfied, execute step 7; otherwise, execute step 6; when the carrier sensing result shows that the channel is busy and does not receive the preamble code, execute step 7;

step 3: the CS detects the length of a data queue of the CS; when the data queue is not empty, execute step 4; otherwise, execute step 7;

step 4, the preamble code is broadcast and transmitted: before transmitting data, the CS firstly transmits the preamble code to establish a communication link with a neighbor node;

step 5, data transmission: if the CS receives a response ACK of the neighbor node in the process of transmitting the preamble code, the CS immediately stops transmitting the preamble code and begins to send a data packet to the neighbor node; if the acknowledgement ACK is received after the data packet is transmitted, it indicates that the data packet is successfully transmitted, and execute step 7; otherwise, it indicates transmission failure and execute step 7;

step 6, preamble code response: the CS enters a receiving state and sends a response ACK, indicating that the CS is ready to receive data; if the data packet is received, the acknowledgement ACK is transmitted to inform a sending node, and execute step 7; otherwise, directly enter step 7;

step 7, dormancy: the CS closes a radio frequency transceiver and simultaneously opens an overtime timer for conducting timing; awakening is conducted again after timing is ended, and execute step 1.

The step that the CS detects whether primary users are occupying an authorized frequency band comprises the following steps:

the CS collects N signal samples on one operating frequency band of the primary users, wherein $N=f*T_s$, f is the sampling frequency of the CS and $T_s$ is spectrum sensing time;

signal energy $$T(y) = \sum_{n=1}^{N} |y(n)|^2$$

of N samples is compared with energy threshold $\varepsilon$, wherein y(n) is the nth signal sample collected by the CS;

if $T(y) \geq \varepsilon$, the CS judges that the primary users are occupying the authorized frequency band; otherwise, the CS judges that the primary users do not occupy the authorized frequency band.

The transmitting cycle of the preamble code is not less than a time interval at which the CS conducts carrier listening.

The preamble code is composed of a plurality of preamble code short cycles. Each preamble code short cycle is divided into two parts, i.e., a transmitting part and a receiving part.

The transmitting part is used to transmit the preamble code and the receiving part is used to wait for the ACK response of the neighbor node satisfying a forwarding condition.

The preamble code comprises hops from the node to a gateway.

The forwarding condition is as follows: H2<H1; H1 indicates hops from the transmitting node to the gateway, and H2 indicates hops from the node to the gateway.

The present invention has the following beneficial effects and advantages:

1. An idle listening problem of the CS and a transmission collision problem between the CS and the primary users we effectively solved through preamble sampling and spectrum sensing technology without a common control channel.

2. Low delay, low overhead and highly reliable transmission of the data in the cognitive sensing network are realized by adopting the method of broadcast preamble sampling.

DETAILED DESCRIPTION

The present invention will be further described in detail below in combination with the drawings and the embodiments.

The present invention relates to cognitive wireless sensor network technologies, and in particular to a medium access control method for a cognitive sensor network based on broadcast preamble sampling. A cognitive node in the cognitive sensor network adopts a periodical dormancy-awakening mechanism. Firstly, a state of a primary user is judged by using a spectrum sensing technology. If the primary user is not active, a data sending node establishes a communication link by using a broadcast preamble code. Each neighbor node simultaneously considers information of hops from a gateway according to an awakening order, and independently determines to serve as a relay node for forwarding data. Furthermore, a transmission conflict between the cognitive node and the primary user may be caused due to return or missed alarm of the primary user. The present invention adopts a retransmission mechanism based on confirmation to ensure transmission reliability of data packets. The present invention is independent of a common control channel, and can realize reliable access of the cognitive sensor network for an authorized frequency band at low overhead.

Figure 1:
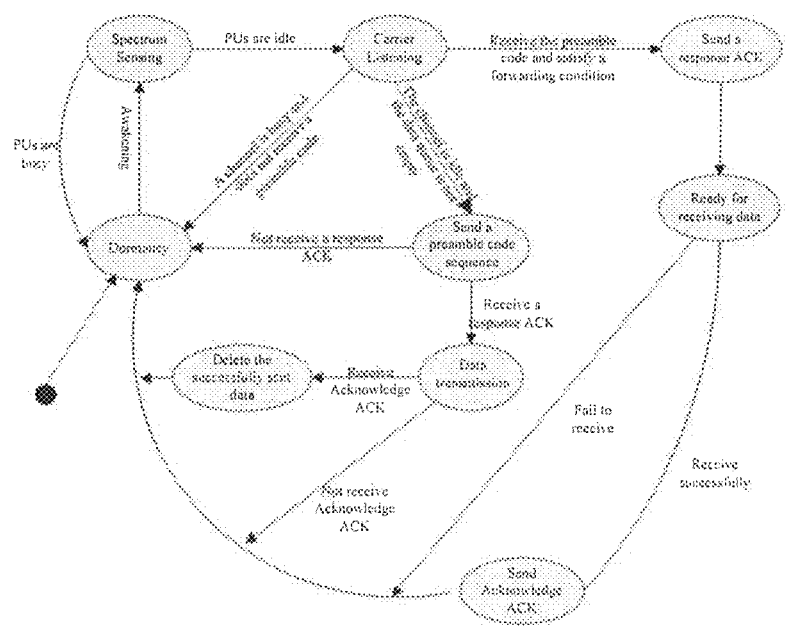
FIG. 1 is a finite-state machine diagram of medium access control based on broadcast preamble sampling.

As shown in FIG. 1, the medium access control method for the cognitive sensor network based on broadcast preamble sampling is disclosed. The CS executes the following steps in each dormancy-awakening cycle:

step 1, spectrum sensing: the CS detects whether primary users (PUs) are occupying an authorized frequency band; when the PUs do not occupy the authorized frequency band, execute step 2; otherwise, execute step 7; the PUs indicate primary users;

step 2, carrier listening: the CS conducts carrier listening; when a carrier listening result shows that a channel is not occupied, execute step 3; when the carrier listening result shows that the channel is busy and receives a preamble code, if a forwarding condition is not satisfied, execute step 7; otherwise, execute step 6; when the carrier listening result shows that the channel is busy and does not receive the preamble code, execute step 7;

step 3: the CS detects the length of a data queue of the CS; when the data queue is not empty, execute step 4; otherwise, execute step 7;

step 4, the preamble code is broadcast and transmitted: before transmitting data, the CS firstly transmits the preamble code to establish a communication link with a neighbor node;

step 5, data transmission: if the CS receives a response ACK of the neighbor node in the process of transmitting the preamble code, the CS immediately stops transmitting the preamble code and begins to send a data packet to the neighbor node; if the acknowledgement ACK is received after the data packet is transmitted, it indicates that the data packet is successfully transmitted, and execute step 7; otherwise, it indicates transmission failure and execute step 7; data not sent successfully is retransmitted in a next cycle; if the data is not sent successfully after retransmitted for several times, the data packet is discarded;

step 6, preamble code response: the CS enters a receiving state and sends a response ACK, indicating that the CS is ready to receive data; if the data packet is successfully received next, the acknowledgement ACK is transmitted to inform a sending node, and execute step 7; otherwise, directly enter step 7;

step 7, dormancy: the CS closes a radio frequency transceiver and simultaneously opens an overtime timer for conducting timing; awakening is conducted again after timing is ended, and execute step 1.

The step that the CS detects whether the PUs are occupying an authorized frequency band through an energy sensing method comprises the following steps:

the CS collects $N=f*T_s$ PUs signal samples through an energy detector, wherein f is the sampling frequency and $T_s$ is spectrum sensing time;

signal energy $$T(y) = \sum_{n=1}^{N} |y(n)|^2$$

of N samples is compared with given energy threshold s, wherein y(n) is the nth signal sample collected through the energy detector, if $T(y) \geq \varepsilon$, the CS judges that the authorized frequency band is occupied by the PUs; otherwise, the CS judges that the authorized frequency band is not occupied by the PUs.

A sending mode of the preamble code is as follows:

Before the CS conducts data transmission, the preamble code is sent firstly in a broadcast mode so as to establish a communication link with neighbor nodes. No specific receiving node is designated in this process. To ensure that the neighbor nodes receive the preamble code, a complete sending cycle of the preamble code shall be not less than a time interval of carrier listening by the sensor node. The preamble code is composed of a plurality of preamble code short cycles. Each preamble code short cycle is divided into two parts, i.e., a transmitting part and a receiving part. The transmitting part is used to transmit the preamble code and the preamble code comprises information of hops from the preamble code to the gateway, and the receiving part is used to wait for the ACK response of the neighbor node satisfying a forwarding condition. When the CS receives a response ACK from the neighbor node in the receiving part, the CS immediately stops transmitting the preamble code and begins to send a data packet to the response node.

A mode of selecting a forwarding node in the neighbor node is as follows:

When the neighbor node awakened at first within the transmission range of the sending code receives the preamble code in the process of carrier monitoring, the information H1 of hops from the sending code to the gateway contained in the preamble code is compared with the information H2 of hops from the preamble code to the gateway. When H2<H1, the sending code satisfies the forwarding condition.

The present invention proposes a medium access control method for a cognitive sensor network based on broadcast preamble sampling. A main idea is that medium access control of the cognitive sensor network is realized through spectrum sensing, carrier listening, queue detection, transmission of the preamble code, data transmission, preamble code response, dormancy and other processes. Destination nodes for receiving the data packet are selected according to the information of hops from the neighbor node to the gateway and the time order of awakening while reliable access of the cognitive sensor network for the authorized frequency band is ensured, thereby reducing time delay.

The present invention is applied to the cognitive sensor network which adopts the opportunity spectrum access mode. It is assumed that a large amount of CSs are deployed in the cognitive sensor network. Each CS is equipped with a half-duplex cognitive radio transceiver, i.e., the CSs can only transmit or receive data in the authorized frequency bend at the same time. The cognitive sensor network constructs a network in a self-organization mode. The network does not need a common control channel and global clock synchronization. By referring to IEEE 802.22 standard, the frame length of each CS is set as T≤100 ms. Each CS circularly executes the self dormancy-awakening cycle, and conducts transmitting-receiving state switching according to the execution condition of above steps. To ensure that the neighbor node receives the preamble code, the duration $T_p$ of transmitting the preamble code is set to be not less than $T_{CI}$, wherein $T_{CI}$ is a time interval of carrier listening by the CS.

The present invention mainly comprises the following realization process:

CS: (1) the CS conducts spectrum sensing; (2) the CS conducts carrier listening; (3) the CS conducts data queue detection; (4) the CS transmits the preamble code; (5) the CS conducts data transmission; (6) the CS responds to the preamble code; and (7) the CS changes to a dormant state.

Figure 2:
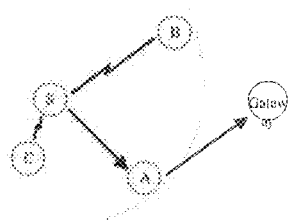
FIG. 2 is an example diagram 1 of a medium access control process based on broadcast preamble sampling.
Figure 3:
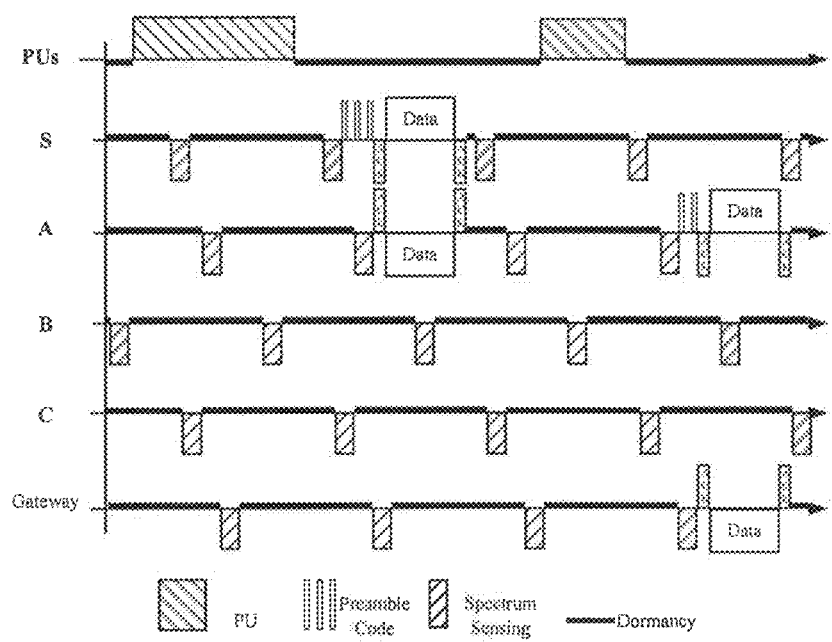
FIG. 3 is an example diagram 2 of a medium access control process based on broadcast preamble sampling.

FIG. 3 gives a time sequence relationship between the above realization processes. FIG. 2 shows that the node S uses the solution to send data to the gateway by selecting the neighbor node A within the transmission range. S, A, B and C are cognitive sensor nodes. A specific process of the present invention is described in detail below in combination with FIG. 1 to FIG. 3.

(1) The CS Conducts Spectrum Sensing

Since the CS needs to access to the authorized frequency band for data transmission, spectrum sensing must be conducted firstly to judge whether PUs are occupying the authorized frequency band. Only when the PUs do not occupy the authorized frequency band, the CS can access to the authorized frequency band to conduct data transmission. According to the condition that the PUs occupy the authorized frequency band, the following binary hypothesis testing model can be established:

$$\begin{cases} H_0 : y_m(n) = u_m(n) \\ H_1 : y_m(n) = h_m(n) \cdot x(n) + u_m(n) \end{cases}$$

$$m = 1, \ldots, M; n = 1, \ldots, N$$

wherein $H_0$ and $H_1$ respectively indicate the condition that the PUs do not occupy the authorized frequency band and the condition that the PUs occupy the authorized frequency band. x(n) indicates a transmission signal of PUs, and $h_m(n)$ and $n_m(n)$ respectively indicate a channel gain from the PUs to the $CS_m$ and noise at $CS_m$. $y_m(n)$ indicates the nth signal sample collected by $CS_m$ through an energy detector, then, $CS_m$ compares signal energy $$T(y_m) = \sum_{n=1}^{N} |y_m(n)|^2 \text{ of } N = f * T_s$$

samples with threshold $\varepsilon_m$ given in advance, wherein f indicates sampling frequency. If $T(y_n) \geq \varepsilon_m$, then $CS_m$ judges that the authorized frequency band is occupied by the PUs; otherwise, the CS judges that the authorized frequency band is not occupied by the PUs, wherein M indicates the number of cognitive sensor nodes.

When the CS judges that the PUs are occupying the authorized frequency band, the CS cannot access to the authorized frequency band and will enter the dormant state to reduce power consumption. When the CS judges that the PUs do not occupy the authorized frequency band, the CS next conducts carrier listening.

(2) The CS Conducts Carrier Listening

The cognitive sensor network constructs a network in a self-organization mode. Each CS makes decisions independently without the need of global time synchronization. When a carrier listening result shows that a channel is idle, the CS detects the data queue of the CS to determine whether to access to the channel. When the carrier listening result shows that the channel is busy and receives a preamble code, the CS judges whether the CS satisfies the forwarding condition; if the forwarding condition is satisfied, the CS conducts preamble code response; otherwise, the CS enters the dormant state. When the channel is busy and does not receive the preamble code, the CS directly enters the dormant state.

(3) The CS conducts data queue detection

The CS detects the length $q_m$ of the data queue (the number of data packets), wherein m=1, 2, . . . M. When $q_m$=0, i.e., when the queue is empty, then the CS changes to the dormant state; otherwise, the CS begins to send the preamble code.

(4) The CS Transmits the Preamble Code

To reduce energy consumption of the network, the CS generally adopts a sleep mode. Therefore, when the CS accesses to the authorized frequency band to send data, if the destination receiving node is in the dormant state, then the CS cannot receive the data, causing time delay of data transmission. To solve the above problems, the CS establishes a communication link by a method of broadcast transmission of the preamble code. Specifically, when the CS accesses to an idle channel, the preamble code will be transmitted. The preamble code contains the information of hops from the node to the gateway. The preamble code is composed of a plurality of preamble code short cycles. Each preamble code short cycle is divided into two parts, i.e., a transmitting part and a receiving part. The transmitting part is used to transmit the preamble code and the receiving part is used to wait for the ACK response of the neighbor node satisfying the forwarding condition.

(5) The CS Conducts Data Transmission

If the CS receives a response ACK sent by the neighbor node, the CS stops transmitting the preamble code and begins to send data to the neighbor node. If the CS never receives the response ACK, the establishment of the communication link is considered to fall and retransmission is conducted in a next cycle.

(6) The CS Responds to the Preamble Code

The CS sends the response ACK, indicating that the CS is ready for receiving the data. If the data packet is successfully received next, the acknowledgement ACK is transmitted to inform a sending node, and then the CS enters the dormant state; otherwise, the CS directly enters the dormant state.

(7) The CS Changes to a Dormant State

The CS closes the transceiver, simultaneously opens the overtime timer and enters the dormant state until the end of the current cycle.

We claim:

1. A medium access control method for a cognitive sensor network based on broadcast preamble sampling, a cognitive sensor (CS) executing the following steps in each dormancy-awakening cycle:

step 1, spectrum sensing: the CS detects whether primary users are occupying an authorized frequency band; if the primary users do not occupy the authorized frequency band, execute step 2; otherwise, execute step 7;

step 2, carrier listening: the CS conducts carrier listening; when a carrier listening result shows that a channel is not occupied, execute step 3; when the carrier listening result shows that the channel is busy and receives a preamble code, if a forwarding condition is not satisfied, execute step 7; otherwise, execute step 6; when the carrier listening result shows that the channel is busy and does not receive the preamble code, execute step 7;

step 3: the CS detects the length of a data queue of the CS; when the data queue is not empty, execute step 4; otherwise, execute step 7;

step 4, the preamble code is broadcast and transmitted: before transmitting data, the CS firstly transmits the preamble code to establish a communication link with a neighbor node;

step 5, data transmission: if the CS receives a response ACK of the neighbor node in the process of transmitting the preamble code, the CS immediately stops transmitting the preamble code and begins to send a data packet to the neighbor node;

if the acknowledgement ACK is received after the data packet is transmitted, it indicates that the data packet is successfully transmitted, and execute step 7; otherwise, it indicates transmission failure and execute step 7;

step 6, preamble code response: the CS enters a receiving state and sends a response ACK, indicating that the CS is ready to receive data; if the data packet is received, the acknowledgement ACK is transmitted to inform a sending node, and execute step 7; otherwise, directly enter step 7;

step 7, dormancy: the CS closes a radio frequency transceiver and simultaneously opens an overtime timer for conducting timing; awakening is conducted again after timing is ended, and execute step 1;

wherein the step that said CS detects whether primary users are occupying an authorized frequency band comprises the following steps:

the CS collects N signal samples on one operating frequency band of the primary users, wherein $N=f*T_s$, f is the sampling frequency of the CS and $T_s$ is spectrum sensing time;

signal energy $$T(y) = \sum_{n=1}^{N} |y(n)|^2$$

of N samples is compared with energy threshold $\varepsilon$, wherein y(n) is the nth signal sample collected by the CS;

if $T(y) \geq \varepsilon$, the CS judges that the primary users are occupying the authorized frequency band; otherwise, the CS judges that the primary users do not occupy the authorized frequency band.

2. The medium access control method for the cognitive sensor network based on broadcast preamble sampling according to claim 1, wherein the transmitting cycle of said preamble code is not less than a time interval at which the CS conducts carrier listening.

3. The medium access control method for the cognitive sensor network based on broadcast preamble sampling according to claim 1, wherein said preamble code is composed of a plurality of preamble code short cycles; each preamble code short cycle is divided into two parts, i.e., a transmitting part and a receiving part; the transmitting part is used to transmit the preamble code and the receiving part is used to wait for the ACK response of the neighbor node satisfying a forwarding condition.

4. The medium access control method for the cognitive sensor network based on broadcast preamble sampling according to claim 1, wherein said preamble code comprises hops from the node to a gateway.

5. The medium access control method for the cognitive sensor network based on broadcast preamble sampling according to claim 1, wherein said forwarding condition is as follows: H2<H1; H1 indicates hops from the transmitting node to the gateway, and H2 indicates hops from the node to the gateway.

* * * * *